No. 767,293.

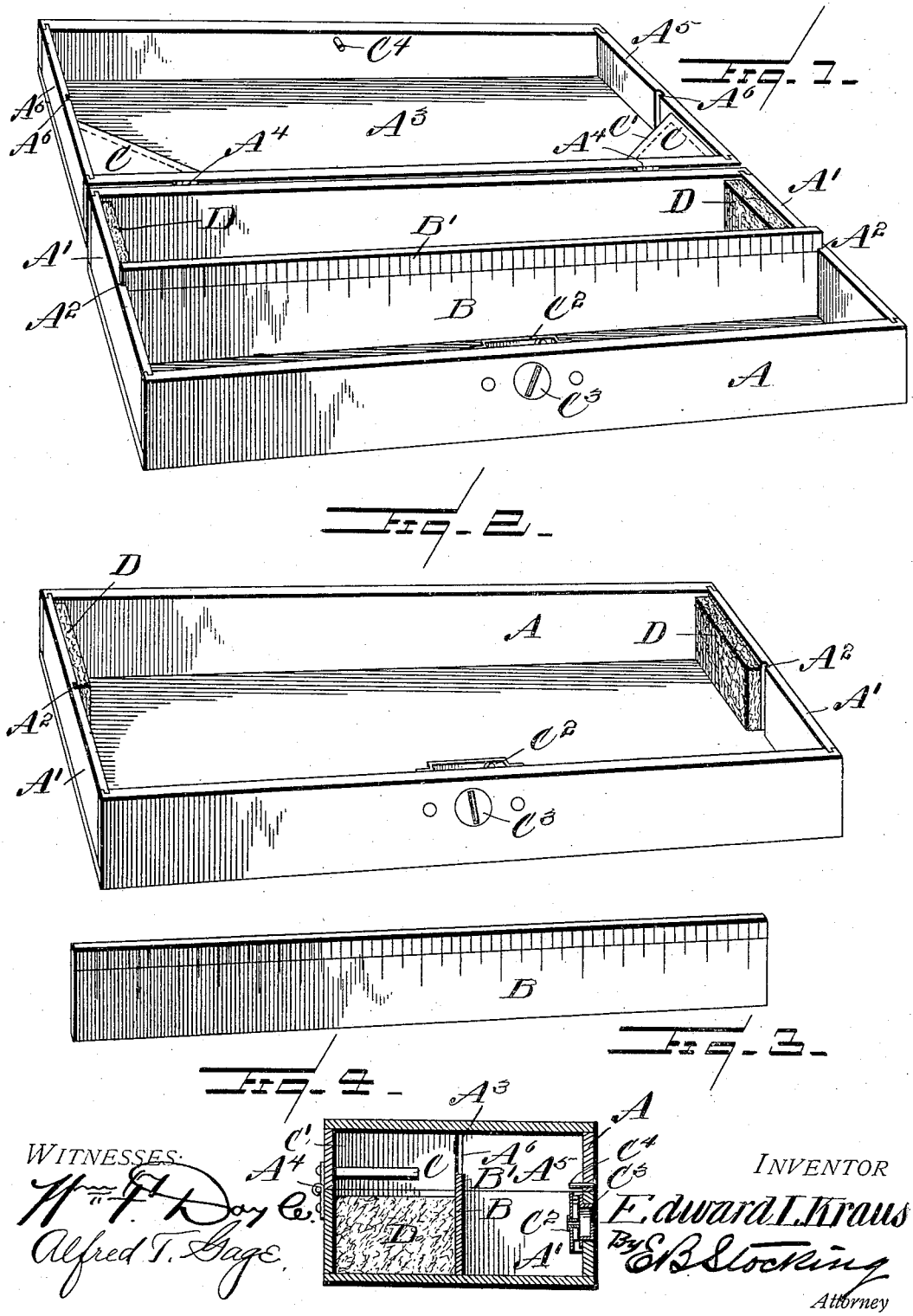

Patented August 9, 1904.

UNITED STATES PATENT OFFICE.

EDWARD L. KRAUS, OF SLATINGTON, PENNSYLVANIA.

SCHOLAR'S COMPANION.

SPECIFICATION forming part of Letters Patent No. 767,293, dated August 9, 1904.

Application filed December 7, 1903. Serial No. 184,107. (No model.)

*To all whom it may concern:*

Be it known that I, EDWARD L. KRAUS, a citizen of the United States, residing at Slatington, in the county of Lehigh, State of Pennsylvania, have invented certain new and useful Improvements in Scholars' Companions, of which the following is a specification, reference being had therein to the accompanying drawings.

This invention relates to a scholar's companion-box, and has for an object to provide such a box having a graduated removable rule supported by grooves at opposite ends of the box, so as to constitute a longitudinal partition when within the box and to be adapted for removal and use as a ruler.

A further object of the invention is to provide cushion-blocks at the opposite ends of the box at one side of the grooves to prevent the breaking of pencil-points or damage to pens by the longitudinal movement thereof against the opposite ends of the box in the carrying of the same, while the box-cover is also provided with corner-pieces adapted to form a recess for retaining a small tablet or slate therein.

Other and further objects and advantages of the invention will be hereinafter described, and the novel features thereof defined by the appended claims.

In the drawings, Figure 1 is a perspective of the box opened. Fig. 2 is a similar view of the box with the lid and rule removed. Fig. 3 is a detail perspective of the rule removed, and Fig. 4 is a central cross-section through the box with the lid closed.

Like letters of reference refer to like parts in the several figures of the drawings.

The letter A designates a box, which may be of any desired size or configuration, and the opposite end walls thereof are each provided with a groove or way $A^2$ in alinement with each other and adapted to receive the ends of a graduated rule B, which is slid into these grooves, and thus forms a removable partition extending longitudinally of the box. The box lid or cover $A^3$ is suitably connected thereto in any desired manner—for instance, by hinges $A^4$—and the ends thereof may, if desired, be provided with grooves or ways $A^6$ in alinement with the edge $B'$ of the rule, which projects above the top of the end walls of the box, so that the ends of said edge may enter the grooves to prevent interference in the closing of the box in the event that the rule is of greater width than the depth of the box.

The box lid or cover is provided with corner-pieces C, spaced from the top of the cover to form a recess $C'$, Fig. 4, to receive a small tablet or slate and support the same within the lid. The front wall of the box is provided with any desired form of lock mechanism $C^2$, having a revolving mask or escutcheon, said lock being adapted to coöperate with a pin $C^4$, carried by the lid $A^3$.

At one side of the grooves $A^2$ at each end of the box cushion-blocks D, formed of felt, paper, or other suitable material, are provided and adapted to prevent the breaking of pencil-points or damage to pens by contact with the opposite ends of the box in the shifting of said articles during the carrying of the box.

From the foregoing it will be obvious that the graduated rule is adapted to be removed whenever desired for use and when replaced within the box forms the longitudinal partition adapted to retain pens and pencils at one side thereof in a compartment having cushion-blocks at its opposite ends, while other articles not liable to such damage may be carried in the front compartment of the box and a slate or tablet disposed in the upper portion thereof. The box as a whole is adapted to be very economically manufactured, owing to its simplicity of construction, and the disposition and arrangement of parts effects a durable construction, which is essential in a box of this character adapted to be roughly handled by children.

Having described my invention and set forth its merits, what I claim, and desire to secure by Letters Patent, is—

1. A scholar's companion comprising a box having grooves at the opposite ends thereof, a graduated rule extended above the box-walls and forming a removable longitudinal partition within the box and having its opposite ends disposed in said grooves, and a lid having grooves in its opposite ends in alinement with the portion of said rule projected above the box-walls.

2. A scholar's companion comprising a box having grooves at the opposite ends, a graduated rule forming a removable longitudinal partition within the box and having its opposite ends disposed in said grooves, and cushion-blocks upon the ends of the box at one side of said grooves.

3. A scholar's companion comprising a box having grooves at the opposite ends thereof, a graduated rule forming a removable longitudinal partition within the box and having its opposite ends disposed in said grooves, cushion-blocks upon the ends of the box at one side of said grooves, and a lid having corner-pieces spaced from the top thereof.

4. A scholar's companion comprising a box having grooves at the opposite ends thereof, a graduated rule extended above the box-walls and forming a removable longitudinal partition within the box and having its opposite ends disposed in said grooves, cushion-blocks upon the ends of the box at one side of said grooves, and a lid having corner-pieces spaced from the top thereof and grooves in alinement with the portion of said rule projected above the box-walls.

In testimony whereof I affix my signature in presence of two witnesses.

EDWARD L. KRAUS.

Witnesses:
  ROBT. H. DALBY,
  ANNIE L. BERKEMEYER.